Nov. 2, 1948.  W. J. SUTTON  2,453,046
WELDING JIG FOR BROKEN DRILLS
Filed April 5, 1946  2 Sheets-Sheet 1
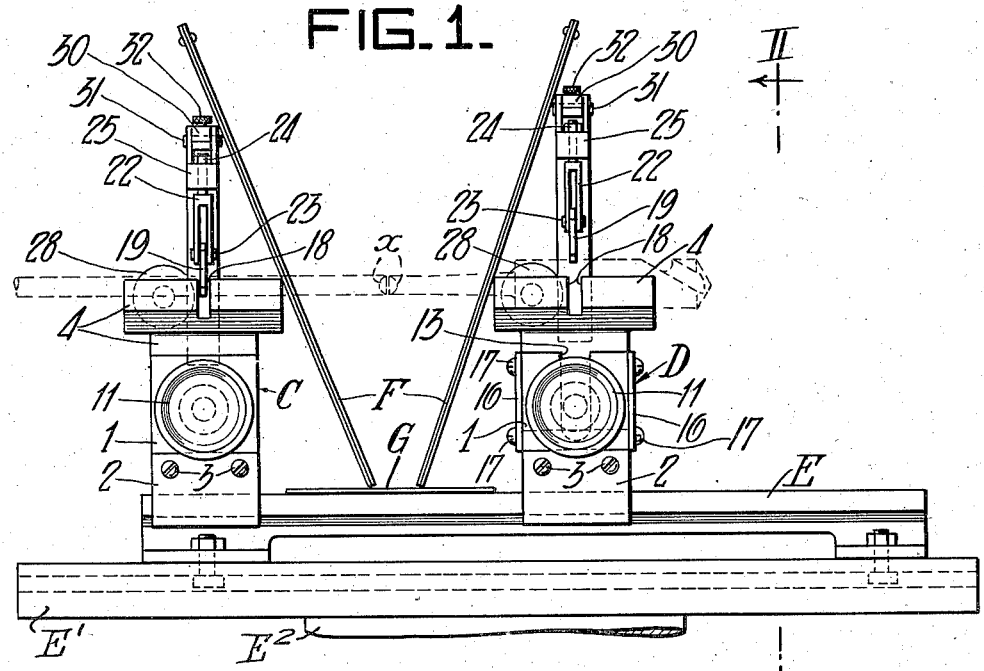
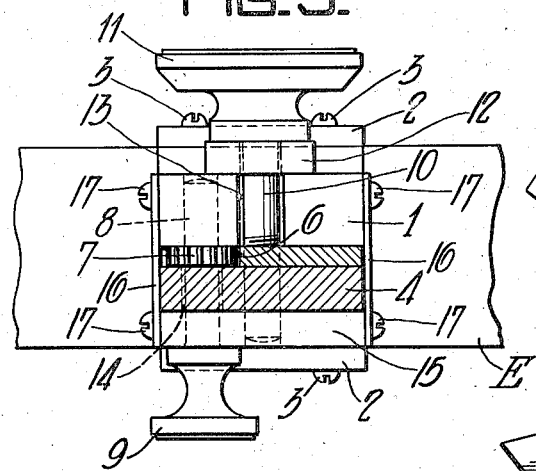
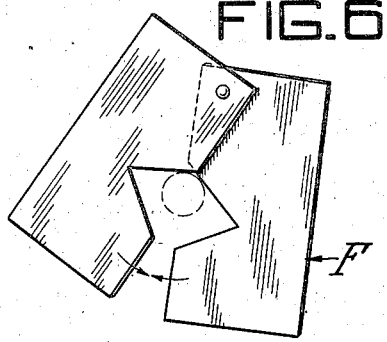
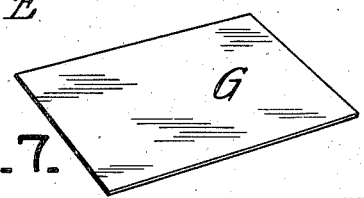
INVENTOR:
WILLARD J. SUTTON,
BY:
Donald G. Dalton
HIS ATTORNEY.

Nov. 2, 1948.  W. J. SUTTON  2,453,046
WELDING JIG FOR BROKEN DRILLS
Filed April 5, 1946  2 Sheets-Sheet 2
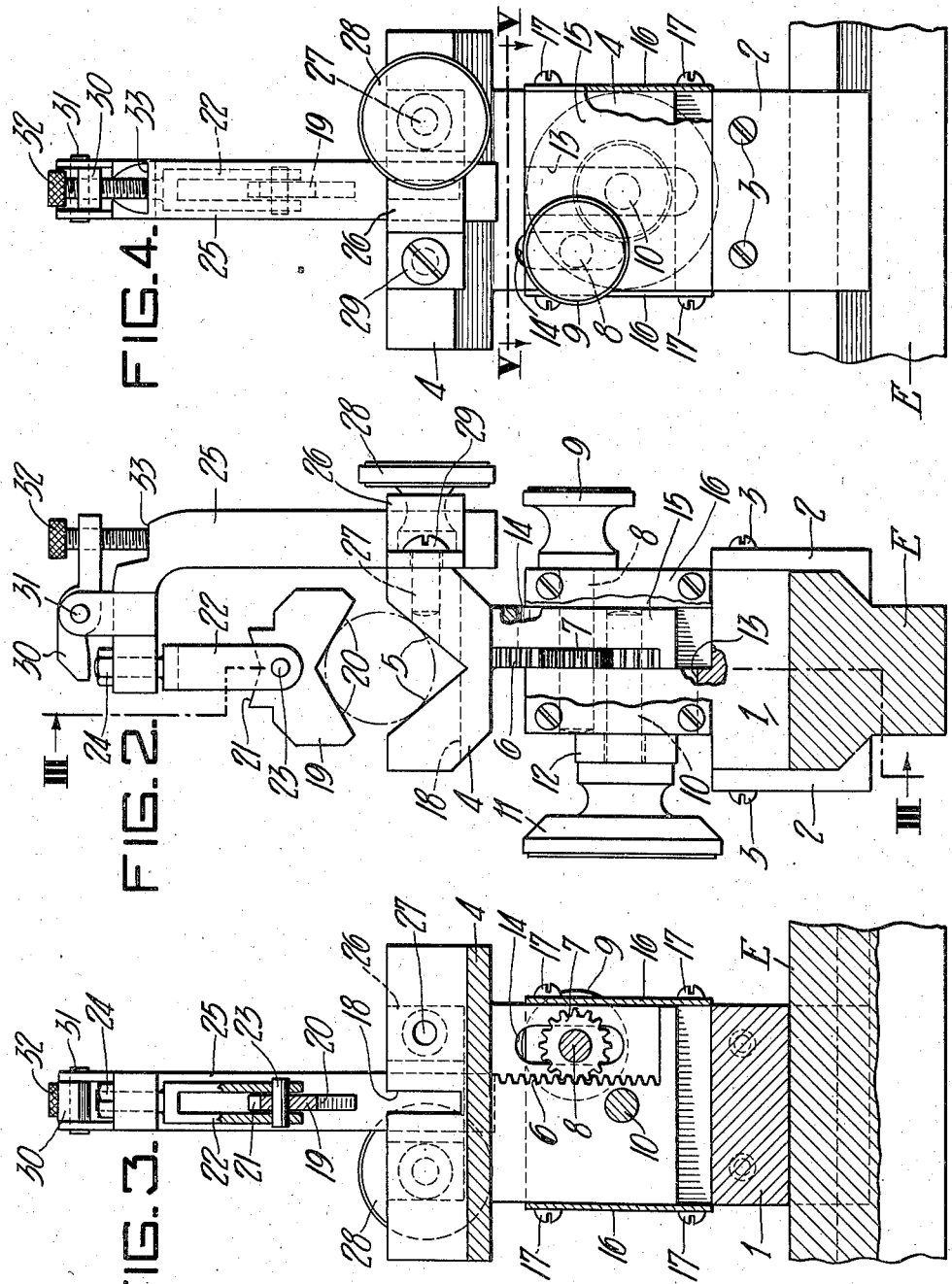
INVENTOR:
WILLARD J. SUTTON,
BY:
Donald G. Dalton
HIS ATTORNEY.

Patented Nov. 2, 1948

2,453,046

UNITED STATES PATENT OFFICE 2,453,046

WELDING JIG FOR BROKEN DRILLS

Willard J. Sutton, Gary, Ind.

Application April 5, 1946, Serial No. 659,935

2 Claims. (Cl. 113—99)

The present invention relates to a novel construction and arrangement of the component parts of a welding jig peculiarly well suited for use in repairing broken drills or similar elongated parts which require being united in axial alignment by means of a welded joint.

One object of the invention is to provide a jig in which broken parts of a drill can be gripped in accurate alignment in preparation for welding. Another object of the invention is to provide a welding jig including a bed with one stand rigidly secured thereto and carrying a fixed work engaging jaw and another stand freely slidable on the bed also carrying a jaw, the two jaw frames being equipped with means for clamping the pieces to be welded. The further object is to provide a jig including a bed having two stands mounted thereon, one of which is rigidly secured to the bed and the other of which is slidable, relative thereto, so as to allow for a slight relative movement between the two stands in order to compensate for variations in the length of the finished, welded workpiece due to the welding heat or to contraction which occurs upon cooling of the steel after completion of the welding.

The above and future features of the invention will be more fully apparent from a consideration of the following detailed disclosure and the appended claims when read in connection with the accompanying drawings in which:

Figure 1 is a side elevation of a welding jig exemplifying the herein claimed invention.

Figure 2 is a section on line II—II of Figure 1.

Figure 3 is a section on line III—III of Figure 2.

Figure 4 is an elevation as viewed from the right side of Figure 2.

Figure 5 is a fragmentary horizontal section on line V—V of Figure 4.

Figures 6 and 7 are detail perspective views of shielding members for protecting parts of the jig from the welding flame.

Referring more particularly to the drawings, my improved jig comprises two stands C and D mounted on a common bed E which is adapted to be rigidly secured to a turntable $E^1$ having a central trunnion $E^2$ mounted in any suitable upright bearing. The stands C and D are substantial duplicates of one another, the chief difference being that stand C is rigidly secured to the bed E, whereas stand D is slidably mounted on the bed for a reason to be hereinafter more fully explained. Each stand carries a jaw frame 4 having a work-receiving V-notch form therein to receive a workpiece to be welded. Reference to Figure 1 illustrates a workpiece in dotted lines comprising a drill, the cutting portion at the right extremity thereof being of larger diameter than the shank portion at the left. Such a relationship between the cutting portion of the drill and the shank is conventional as it permits the chips cut by the drill to work their way to the surface of the work. The jig of the present invention is peculiarly well suited for welding broken drills and provides means for accurately compensating for difference in diameters of the drill and the shank portion of the workpiece.

The jaw frame 4 in the stand C is normally fixedly secured to the stand whereas the corresponding jaw frame in the stand D is mounted in such a way as to provide for vertical adjustment. The description of the component parts of the stand D will suffice also for the parts of stand C and since the parts as above mentioned are substantial duplicates, accordingly, the duplicate parts have been identified by the same reference numerals in the drawings. As shown, the stand D consists of a carriage 1 having side guides 2 fastened thereto by means of screws 3. The side guides 2 are provided at their lower extremities with inwardly extending projections machined to make a sliding fit with the over-hanging parts of the bed E as clearly shown in Figure 2. The bottom jaw frame 4 has a work-receiving notch 5 cut in the top thereof so as to form a self-centering seat for a cylindrical workpiece, such, for example, as the body of the drill which is represented by the circle shown in dot and dash lines in Figure 2. The jaw frame 4 has a rack 6 secured thereto, which meshes with a pinion 7 secured to an operating shaft 8 having a handle 9 adapted to be turned so as to move the jaw frame up or down as desired. After proper vertical adjustment of the frame 4 has been made, it is adapted to be locked in position by means of a screw 10 having a hand wheel 11 secured thereto which presses on a washer 12 so that when the screw is turned up tight the jaw frame 4 is firmly clamped in the position to which it had been adjusted by manipulation of the pinion 7. To allow for vertical adjustment of the jaw frame, the latter is formed with a slot 14 so that the shaft 8 will not interfere with the free up-and-down movement during the making of vertical adjustments. As indicated at 15, I provide a guide block which serves as a guide for the frame 4 and provides a bearing for the shaft 8. This guide block 15 is fastened to the carriage by means of side plates 16 and screws 17 as shown. A slot 18 is formed in the jaw frame 4 and serves as a guide for a clamp member indicated at 19. This clamp member is formed with lower and upper V-shaped notches adapted to engage large and small diameter drills. The clamp 19 is secured pivotally by pin 23 to a clamp holder 22 which has a vertical shank carrying nut 24 by means of which the clamp holder can be adjustably suspended from a post 25 which is adjustably secured to the jaw frame 4 by means of a locking bar 26. In order to provide for the vertical adjustment of the post 25 I utilize a screw 27 carrying a hand wheel 28. When the screw 27 is released or loosened by proper manipulation of the hand wheel, the post 25 may be lowered a sufficient distance to engage the notch 20 of the clamp 19 with the periphery of the large diameter or working portion of the drill. The locking bar 26 is then tightened by manipulation of the screw 27. The bar 26 at the time of adjustment pivots around a screw 29, the arrangement being such that there is slight clearance between the jaw frame 4 and the locking bar 26 so that when the locking screw 27 is loosened, the locking bar 26 is loose on the pivot screw 29. After the post 25 has been adjusted over the drill and locked in position the upper end of the clamp holder 22 will be contacting the post 25. In order to exert sufficient pressure on the drill to securely hold it in place, I provide a pressure finger 30 which is pivoted on a pin 31 secured to a lug projecting upwardly from the post 25. The member 30 has an extension threaded to receive a set screw 32 and the lower end of the set screw bears against a notched seat 33 formed in the post 25 as clearly shown in Figure 2. By manipulating the knurled head of the set screw, the required pressure on the drill may be readily obtained and after welding of the drill is completed the pressure may be quickly released by retracting the set screw.

In normal operation after the drill and the shank portion thereof are lined up or set in readiness for the welding operation, shields F and G, such as shown in detail, in Figures 6 and 7 are positioned in the locations illustrated in Figure 1 so as to protect the working parts of the jig from the intense heat of the welding flame. Prior to positioning the drill and shank portions to be united, the ends of the same are usually ground to form blunt chisel points as indicated at $x$ in Figure 1. In lining up the two parts in the jig, the flat surfaces of the chisel points are advantageously placed in vertical position so that the welding may be completed from the sides rather than from below. Because the construction and arrangement of the component parts of the device shown and described, it will be apparent that the stand D is freely slidable on the bed E. This is considered important as it permits limited relative motion between the stands C and D as a result of expansion caused by the welding heat and also permits the stand D to slide toward the stand C as the heat from the weld dissipates upon cooling and results in a contraction of the steel. The preferred design is that in which the entire stand C is one solid block with the notched jaw frame 4 formed as an integral part of the carriage. The V-groove in this case is stationary and the stand C is rigidly secured to the bed E by means of the screws 3 as shown. The design of the post, the clamp, and locking mechanism attached to the post is identical to that described in connection with the stand D. When locking a drill with a tapered shank in the device, a sleeve having a tapered hole fitting the drill shank and a cylindrical exterior is required. This provides the most accurate alignment of drill and the shank since the only adjustment in aligning the two parts to be welded is a vertical adjustment which is readily accomplished by manipulation of the pinion 7. If desired, an alternative means for gripping the tapering shank of a drill in the stand D could be made available by making the stand in two parts including a bottom jaw pivotally mounted so as to be adjustable to suit the angle of the taper.

While I have illustrated and described a practical embodiment of the invention which a reduction to practice has demonstrated to be highly desirable, it is to be understood that various modifications may be made by those skilled at the art without departing from the invention as defined in the appended claims.

I claim:

1. A jig for holding metal work pieces in alignment for welding comprising a bed, a first upright stand fixed to said bed, a second upright stand slidably carried by said bed and being freely movable toward and away from said first stand, a jaw fixed to one of said stands and having a work receiving notch, a jaw carried by the other stand for vertical adjustment and having a work receiving notch, rack and pinion means and clamp means carried by the stand having the adjustable jaw for effecting adjustment of this jaw and fixing its position, posts carried by each of said stands for vertical adjustment and having arms overhanging the work receiving notches of said jaws, work clamps carried by said arms and being cooperable with said jaws for clamping work pieces, and fingers fulcrumed to said arms for engaging and releasing said work clamps from the work piece.

2. A jig for holding metal work pieces in alignment for welding comprising a bed, a first upright stand fixed to said bed, a second upright stand slidably carried by said bed and being freely movable toward and away from said first stand, a jaw fixed to one of said stands and having a work receiving notch, a jaw carried by the other stand for vertical adjustment and having a work receiving notch, rack and pinion means and clamp means carried by the stand having the adjustable jaw for effecting adjustment of this jaw and fixing its position, posts carried by each of said stands for vertical adjustment and having arms overhanging and spaced above the work receiving notches of said jaws, work clamps adjustably suspended from said arms and having notches cooperable with the notches in said jaws for clamping work pieces, and fingers fulcrumed to said arms and engageable with said work clamps for fixing said work clamps in clamping position.

WILLARD J. SUTTON.

REFERENCES CITED

The following references are of record in the file of this patent:

UNITED STATES PATENTS

| Number | Name | Date |
|---|---|---|
| 385,386 | Thompson | July 3, 1888 |
| 515,778 | Lemp et al. | Mar. 6, 1894 |
| 810,319 | Blazej | Jan. 16, 1906 |
| 1,125,253 | Barber | Jan. 19, 1915 |
| 1,418,655 | Klemmer | June 6, 1922 |
| 1,476,611 | Hines | Dec. 4, 1923 |
| 1,585,490 | Hainsworth | May 18, 1926 |
| 2,021,336 | Swartz | Nov. 19, 1935 |